(12) United States Patent
McMan et al.

(10) Patent No.: US 6,974,850 B2
(45) Date of Patent: Dec. 13, 2005

(54) OUTDOOR WEATHERABLE PHOTOPOLYMERIZABLE COATINGS

(75) Inventors: Steven J. McMan, Stillwater, MN (US); Stephen A. Johnson, Woodbury, MN (US); Clinton L. Jones, Somerset, WI (US); Eric W. Nelson, Stillwater, MN (US); Emily S. Goenner, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/448,895

(22) Filed: May 30, 2003

(65) Prior Publication Data

US 2004/0242735 A1 Dec. 2, 2004

(51) Int. Cl.$^7$ .............................................. C08F 220/10
(52) U.S. Cl. ..................... 524/556; 524/91; 524/492; 524/558; 524/559; 548/259; 428/411.1
(58) Field of Search .................... 524/556, 91, 492, 524/558, 559; 548/259; 428/411.1

(56) References Cited

U.S. PATENT DOCUMENTS

| | | |
|---|---|---|
| 3,004,896 A | 10/1961 | Heller et al. |
| 3,055,896 A | 9/1962 | Boyle et al. |
| 3,072,585 A | 1/1963 | Milionis et al. |
| 3,074,910 A | 1/1963 | Dickson, Jr. et al. |
| 3,189,615 A | 6/1965 | Heller et al. |
| 3,230,194 A | 1/1966 | Boyle et al. |
| 4,127,586 A | 11/1978 | Rody et al. |
| 4,226,763 A | 10/1980 | Dexter et al. |
| 4,275,004 A | 6/1981 | Winter et al. |
| 4,315,848 A | 2/1982 | Dexter et al. |
| 4,347,180 A | 8/1982 | Winter et al. |
| 4,383,863 A | 5/1983 | Dexter et al. |
| 4,675,352 A | 6/1987 | Winter et al. |
| 4,681,905 A | 7/1987 | Kubota et al. |
| 4,853,471 A | 8/1989 | Rody et al. |
| 5,104,929 A | 4/1992 | Bilkadi |
| 5,126,394 A * | 6/1992 | Revis et al. ............... 524/548 |
| 5,278,314 A | 1/1994 | Winter et al. |
| 5,280,124 A | 1/1994 | Winter et al. |
| 5,294,473 A | 3/1994 | Kawamoto |
| 5,318,850 A | 6/1994 | Pickett et al. |
| 5,436,349 A | 7/1995 | Winter et al. |
| 5,516,914 A | 5/1996 | Winter et al. |
| 5,559,163 A | 9/1996 | Dawson et al. |
| 5,607,987 A | 3/1997 | Winter et al. |
| 5,977,219 A | 11/1999 | Ravichandran et al. |
| 6,166,218 A | 12/2000 | Ravichandran et al. |
| 6,187,845 B1 | 2/2001 | Renz et al. |
| 6,245,915 B1 | 6/2001 | Wood et al. |
| 6,262,151 B1 | 7/2001 | Ravichandran et al. |
| 6,268,415 B1 | 7/2001 | Renz et al. |
| 6,350,521 B1 | 2/2002 | Chen et al. |
| 6,451,887 B1 * | 9/2002 | Wood et al. ............... 524/91 |
| 2003/0109599 A1 * | 6/2003 | Kamen .................. 523/160 |

FOREIGN PATENT DOCUMENTS

| | | |
|---|---|---|
| EP | 0 131 468 A2 | 1/1985 |
| EP | 0 736 577 A1 | 9/1996 |
| WO | WO 98/34981 | 8/1998 |

* cited by examiner

*Primary Examiner*—David W. Wu
*Assistant Examiner*—Satya B Sastri
(74) *Attorney, Agent, or Firm*—Carolyn A. Bates

(57) ABSTRACT

Plastic articles can be coated with polymerizable compositions containing a vinyl-functional crosslinkable film former, a large amount of benzotriazole and a copolymerizable monomer that solubilizes the benzotriazole. The cured compositions help protect the article from UV exposure and other weathering effects.

19 Claims, 2 Drawing Sheets

US 6,974,850 B2

OUTDOOR WEATHERABLE PHOTOPOLYMERIZABLE COATINGS

This invention relates to a polymeric coatings, methods for coating articles and coated articles.

BACKGROUND

References relating to ultraviolet absorbers ("UVAs") in photopolymerizable coatings include U.S. Pat No. 5,318,850 (Pickett et al.), U.S. Pat No. 5,559,163 (Dawson et al.), U.S. Pat No. 5,977,219 (Ravichandran et al. '219), U.S. Pat No. 6,187,845 (Renz et al.) and U.S. Pat No. 6,262,151 (Ravichandran et al. '151), and published PCT Application No. WO 98/34981 (Eastman Chemical Company). U.S. Pat. No. 5,294,473 (Kawamoto) describes polyethylene 2,6-dinaphthalate ("PEN") photographic supports that can contain UVAs.

SUMMARY OF THE INVENTION

When exposed to sufficiently intense or sufficiently lengthy outdoor weather conditions, polymeric coatings eventually fail. UVAs can be added to a coating composition prior to polymerization in order to extend the life of the polymerized coating or to protect an underlying material. However, the presence of the UVA can compromise polymerization when ultraviolet light ("UV") curing is employed. Also, many UVAs have only limited solubility in photopolymerizable coating compositions unless solvents are also employed. Solventless coating compositions are desirable for a variety of reasons including possible environmental damage and increased material costs that may accompany solvent use, and the greater time and possible fire or explosion hazards that may accompany solvent drying. UVAs may also "bloom" (become apparent at the surface) in a cured coating if solvents have been employed to attain high UVA loading levels.

We have found that large amounts of benzotriazole UVAs can be dissolved in polymerizable compositions containing a vinyl-functional crosslinkable film former and a copolymerizable monomer that solubilizes the benzotriazole. The resulting compositions need not employ solvents (although they may do so if desired) and can provide cured coatings having very good UV resistance, yet can avoid blooming even at very high benzotriazole loading levels.

The present invention provides, in one aspect, a homogenous coating composition comprising:

a) at least one vinyl-functional crosslinkable film former;
b) more than 15 weight percent benzotriazole UV absorber; and
c) at least one copolymerizable monomer that solubilizes the benzotriazole.

In another aspect, the invention provides a process for making a UV resistant coating comprising:

a) providing a support;
b) coating at least a portion of the support with a homogenous mixture comprising (i) at least one vinyl-functional crosslinkable film former; (ii) more than 15 weight percent benzotriazole UV absorber; and (iii) at least one copolymerizable monomer that solubilizes the benzotriazole; and
c) polymerizing the coating.

In a further aspect, the invention provides an article comprising a support overcoated with a UV resistant coating comprising the polymerized reaction product of a homogenous mixture comprising:

a) at least one vinyl-functional crosslinkable film former;
b) more than 15 weight percent benzotriazole UV absorber; and
c) at least one copolymerizable monomer that solubilizes the benzotriazole.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1:
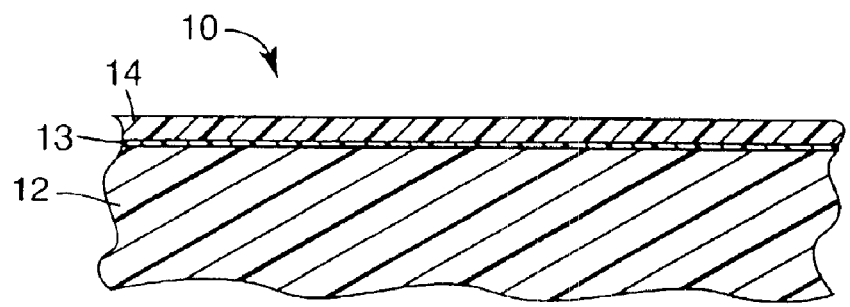
FIG. 1 is a schematic cross-sectional view of a disclosed coated article.

By using the term "homogenous" with respect to a composition or mixture we refer to a liquid that on visual inspection appears to have a single phase free of precipitates or undissolved solids. A homogenous composition or mixture may be found on more detailed inspection to be a suspension, dispersion, emulsion or other microscopically multiphase form.

By using the term "polymer" we refer to homopolymers and copolymers, as well as to homopolymers or copolymers that may be formed in a miscible blend, e.g., by coextrusion or by reaction, including, e.g., transesterification. The term "copolymer" includes alternating, random and block copolymers.

By using the term "coating thickness" we refer unless otherwise specified to the thickness of a coating after it has been polymerized or otherwise cured.

By using the term "film former" we refer to a material that can be coated in a thin layer (e.g., of about 0.05 mm before polymerization) on a suitable support and polymerized to form a substantially continuous coating.

By using the term "vinyl-functional" with respect to a crosslinkable film former, we refer to a material having vinyl (—CH=CH$_2$) groups that through the action of heat, light, electron beam or other activating energy (and if need be in the presence of a suitable initiator) can form a substantially continuous coating of crosslinked polymer. The crosslinked state is generally characterized by solvent insolubility, but may be characterized by swellability in the presence of an appropriate solvent.

By using the term "copolymerizable" with respect to a monomer we refer to a monomer that can be polymerized with a vinyl-functional crosslinkable film former to form a substantially continuous coating of crosslinked polymer.

By using the term "blooming" we refer to the formation of a visible deposit or nonuniform discoloration at the surface of a cured polymer coating.

By using the term "solubilizes" with respect to liquids, we refer to dissolution of a solid into a liquid to form a homogeneous mixture. By using the term "solubilizes" with respect to cured coatings made from liquid monomers, we refer to the dissolution of a solid into the liquid monomers to form a homogeneous mixture, and to the retention of the solid in the cured coating without blooming, internal haze, or other visible signs of phase separation.

By using the term "visible light-transmissive" with respect to an article or element thereof, we mean that the article or element has an average transmission over the visible portion of the spectrum, $T_{vis}$, of at least about 20%, measured along the normal axis.

By using the term "optically clear" with respect to an article or element thereof we refer to an absence of visibly noticeable distortion, haze or flaws as detected by the naked eye at a distance of about 1 meter, preferably about 0.5 meters.

By using words of orientation such as "atop", "on", "uppermost" and the like for the location of various elements in an article of the invention, we refer to the relative position of the element with respect to a horizontal support or reference plane. We do not intend that such elements or articles should have any particular orientation in space during or after their manufacture.

By using the term "overcoated" to describe the position of a layer with respect to a support or other element (e.g., an underlying layer) in an article of the invention, we refer to the recited layer as being atop the support or other element, but not necessarily contiguous to the support or other element. By using the term "separated by" to describe the position of a first element with respect to two other elements, we refer to the first element as being between the other elements but not necessarily contiguous to either other element.

By using the term "weathering" we refer to the effects of prolonged exposure to simulated or actual outdoor weather conditions including sun, rain, airborne contaminants and heat, or to simulated or actual indoor illumination conditions including high-intensity bulbs, indoor lighting and the like. For cured polymer coatings or polymeric substrates, common weathering failure modes include yellowing, cracking, peeling, delamination or haze.

Referring to FIG. 1, an article of the invention is shown generally at 10. Article 10 includes support 12 made of plastic or other material subject to degradation when exposed to weathering. Support 12 is overcoated with primer layer 13 and UV resistant coating layer 14. Coating 14 contains a high percentage of a benzotriazole UV absorber (not shown in FIG. 1) that helps to protect support 12 from weathering including UV exposure.

Figure 2:
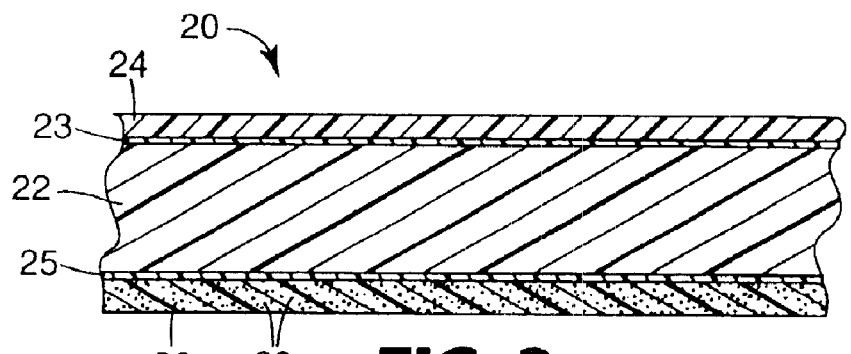
FIG. 2 is a schematic cross-sectional view of a disclosed coated film.

FIG. 2 shows a film article of the invention 20 having flexible film support 22 overcoated on its upper and lower surfaces with primer layers 23, 25 and UV resistant coating layers 24, 26. Coating 26 is a hardcoat layer containing submicron inorganic particles 28 that help protect the lower surface of article 20 from damage or abrasion.

Figure 3:
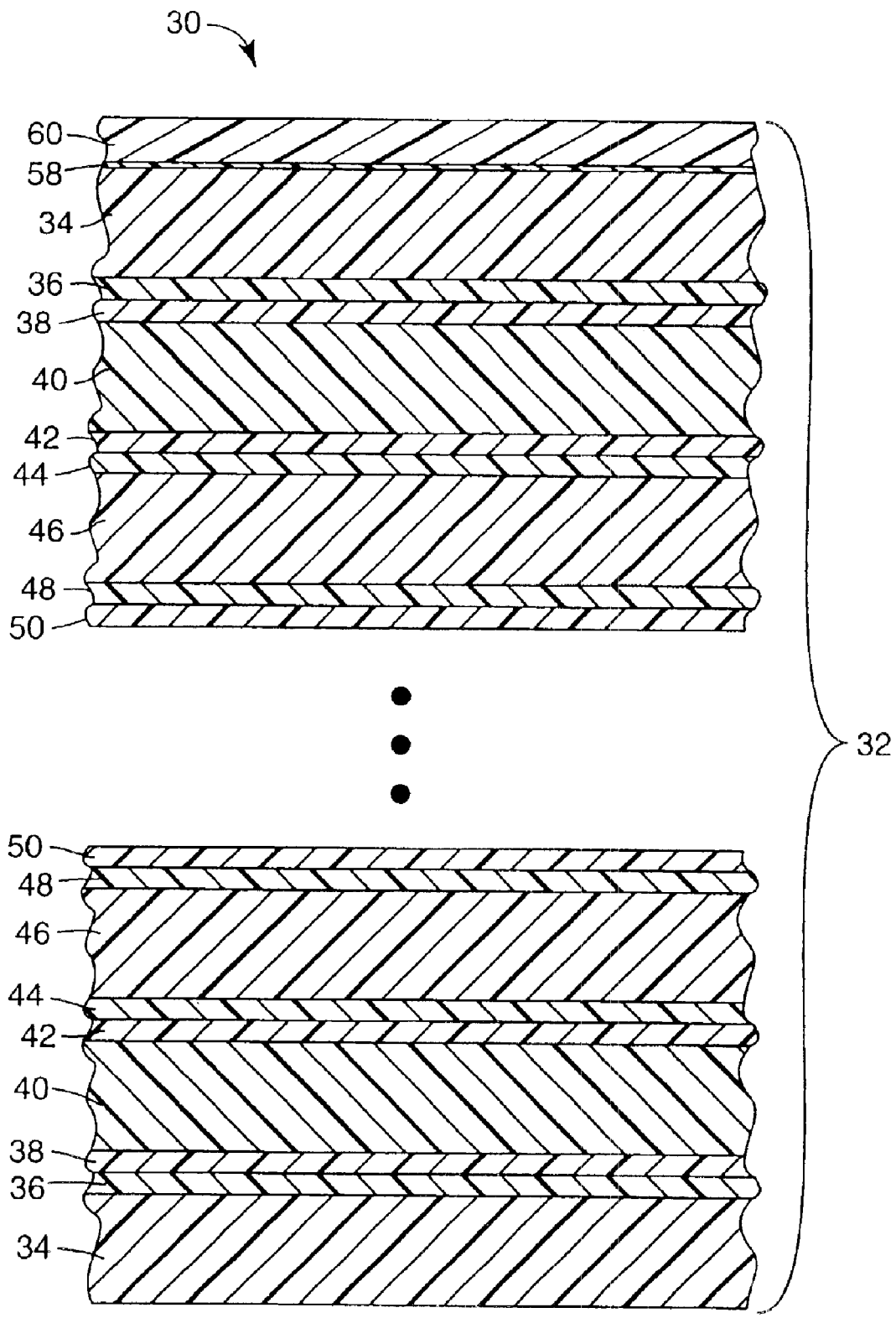
FIG. 3 is a schematic cross-sectional view of a disclosed coated multilayer optical film.

FIG. 3 shows a multilayer optical film article of the invention 30 having flexible film support 32 made from a large number (e.g., 10, 100, 1000 or even more) of thin layers such as layers 34, 38, 42, 46 and 50 of a first polymer and layers 36, 40, 44 and 48 of a second polymer. Not all of these layers are shown in FIG. 3. The missing layers are indicated using an ellipsis. Outer skin layer 60 lies atop primer layer 58 and protects the underlying layers in article 30 from damage.

Figure 4:
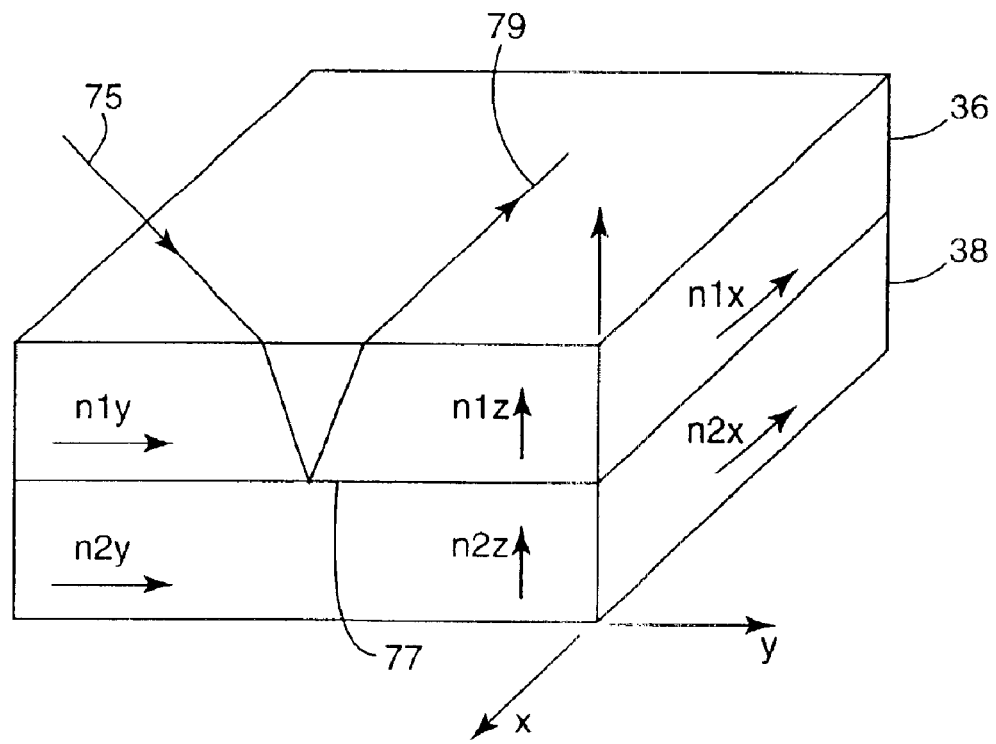
FIG. 4 is a schematic perspective view of a stack of two polymeric layers forming an interface.

Referring to FIG. 4, two adjacent layers 36 and 38 are shown in perspective view. Layer 36 (and other layers of the same second polymer such as layers 40, 44 and 48, not shown in FIG. 4) have in-plane indices of refraction n1x and n1y in the x- and y-axis (in-plane) directions and index of refraction n1z in the z-axis (out-of-plane) direction. Layer 38 (and other layers of the same first polymer such as layers 34, 38, 42, 46 and 50, not shown in FIG. 4) have in-plane indices of refraction n2x and n2y in the x- and y-axis directions and index of refraction n2z in the z-axis direction. Incident light ray 75 will be refracted as it passes through layer 36, reflected at interface 77, refracted as it passes once again through layer 76 and then will exit layer 76 as reflected ray 79. The reflectance characteristics of the multilayer optical film article will be determined by the respective indices of refraction for the layers within the support. In particular, reflectivity will depend upon the relationship between the indices of refraction of each layer material in the x, y, and z directions. A multilayer optical film article such as article 30 of FIG. 3 can have especially useful optical properties when formed using at least one uniaxially birefringent polymeric material having two indices (typically along the x and y axes, or nx and ny) that are approximately equal, and different from the third index (typically along the z axis, or nz). Multilayer optical films in which all the optical layers are isotropic in their refractive index can also be used.

A variety of supports can be employed in the invention. Representative supports include cellulosic materials (e.g., cellulose triacetate or "TAC"); polyolefins such as low-density polyethylene ("LDPE"), linear low-density polyethylene ("LLDPE"), high density polyethylene ("HDPE"), polypropylene ("PP") and cyclic olefin copolymers (e.g., metallocene-catalyzed cyclic olefin copolymers or "COCs"); acrylates and methacrylates such as polymethyl methacrylate ("PMMA"), ethylene ethyl acrylate ("EEA"), ethylene methyl acrylate ("EMA") and ethylene vinyl acrylate ("EVA"); styrenics such as polystyrene ("PS"), acrylonitrile-butadiene-styrene ("ABS"), styrene-acrylonitrile ("SAN"), styrene/maleic anhydride ("SMA") and poly α-methyl styrene ; polyamides such as nylon 6 ("PA6"); polyvinyl chloride ("PVC"); polyoxymethylene ("POM"), polyvinylnaphthalene ("PVN"), polyetheretherketone ("PEEK"), polyaryletherketone ("PAEK"), fluoropolymers (e.g., DYNEON™ HTE terpolymer of hexafluoropropylene, tetrafluoroethylene, and ethylene), polycarbonates such as polycarbonate of bisphenol A ("PC"), polyarylate ("PAR"), polysulfone ("PSul"), polyphenylene oxide ("PPO"), polyetherimide ("PEI"), polyarylsulfone ("PAS"), poly ether sulfone ("PES"), polyamideimide ("PAI"), polyimide and polyphthalamide. A further preferred class of supports includes heat stabilized PET ("HSPET"); terephthalate polyesters and copolyesters such as polyethylene terephthalate ("PET") and terephthalate copolyesters ("coPETs"); and naphthalate polyesters and copolyesters such as polyethylene naphthalate ("PEN"), naphthalate copolyesters ("coPENs") and polybutylene 2,6-naphthalate ("PBN"). A preferred coPEN employs carboxylate subunits derived from 90 mol % dimethyl naphthalene dicarboxylate and 10 mol % dimethyl terephthalate and glycol subunits derived from 100 mol % ethylene glycol subunits to provide a polymer having an intrinsic viscosity (IV) of 0.48 dL/g and an index of refraction is approximately 1.63.

For applications where optical performance is important, the cured coating preferably has a visible light transmission of at least about 70% at 550 nm, and more preferably at least about 80%. The support can if desired be uni-directionally oriented, biaxially oriented or heat-stabilized, using heat setting, annealing under tension or other techniques that will discourage shrinkage up to at least the heat stabilization temperature when the support is not constrained. The support can have any desired thickness. For applications involving flexible film supports that are made or coated using roll-to-roll processing equipment, the support preferably has a thickness of about 0.005 to about 1 mm, more preferably about 0.025 to about 0.25 mm. If skin layers and other optional non-optical layers are employed in multilayer optical films containing first and second polymer layers, the skin layers and non-optical layers can be thicker than, thinner than, or the same thickness as the first and second polymer layers. The thickness of the skin layers and non-optical layers is generally at least four times, typically at least 10 times, and can be at least 100 times, the thickness of at least one of the individual first and second polymer layers.

A variety of vinyl-functional crosslinkable film formers (sometimes referred to below as "film formers") can be employed in the invention. Representative film formers typically will be monomers or oligomers having di- or higher vinyl functionality such as alkyl di-, tri-, tetra- and higher-functional acrylates and methacrylates, and monomers and oligomers having allyllic, fumaric or crotonic unsaturation. Preferred film formers (and in some cases their glass transition temperature or "Tg" values) include, but are not limited to, stearyl acrylate (e.g., SR-257, Tg=about 35° C., commercially available from Sartomer Company), stearyl methacrylate (e.g., SR-324, Tg=about 38° C., commercially available from Sartomer Company), glycidyl methacrylate (e.g., SR-379, Tg=about 41° C., commercially available from Sartomer Company), 1,6-hexanediol diacrylate (e.g., SR-238, Tg=about 43° C., commercially available from Sartomer Company), urethane methacrylates (e.g., CN-1963, Tg=about 45° C., commercially available from Sartomer Company), 1,4-butanediol diacrylate (e.g., SR-213, Tg=about 45° C., commercially available from Sartomer Company), alkoxylated aliphatic diacrylates (e.g., SR-9209, Tg=about 48° C., commercially available from Sartomer Company), alkoxylated cyclohexane dimethanol diacrylates (e.g., CD-582, Tg=about 49° C., commercially available from Sartomer Company), ethoxylated bisphenol A dimethacrylates (e.g., CD-541, Tg=about 54° C., SR-601, Tg=about 60° C. and CD-450, Tg=about 108° C., all commercially available from Sartomer Company), 2-phenoxyethyl methacrylate (e.g., SR-340, Tg=about 54° C., commercially available from Sartomer Company), epoxy acrylates (e.g., CN-120, Tg=about 60° C., CN-124, Tg=about 64° C. and CN-104, Tg=about 67° C., all commercially available from Sartomer Company), tripropylene glycol diacrylate (e.g., SR-306, Tg=about 62° C., commercially available from Sartomer Company), trimethylolpropane triacrylate (e.g., SR-351, Tg=about 62° C., commercially available from Sartomer Company), diethylene glycol dimethacrylate (e.g., SR-231, Tg=about 66° C., commercially available from Sartomer Company), epoxy methacrylates (e.g., CN-151, Tg=about 68° C., commercially available from Sartomer Company), triethylene glycol diacrylate (e.g., SR-272, Tg=about 70° C., commercially available from Sartomer Company), urethane acrylates (e.g., CN-968, Tg=about 84° C. and CN-983, Tg=about 90° C., both commercially available from Sartomer Company, PHOTOMER™ 6210, PHOTOMER 6010 and PHOTOMER 6230, all commercially available from Cognis Corporation, EBECRYL™ 8402, EBECRYL 8807 and EBECRYL 4883, all commercially available from UCB Radcure, and LAROMER™ LR 8739 and LAROMER LR 8987, both commercially available from BASF), dipentaerythritol pentaacrylates (e.g., SR-399, commercially available from Sartomer Company, Tg=about 90° C.), epoxy acrylates blended with styrene (e.g., CN-120S80, commercially available from Sartomer Company, Tg=about 95° C.), di-trimethylolpropane tetraacrylates (e.g., SR-355, commercially available from Sartomer Company, Tg=about 98° C.), diethylene glycol diacrylates (e.g., SR-230, commercially available from Sartomer Company, Tg=about 100° C.), 1,3-butylene glycol diacrylate (e.g., SR-212, commercially available from Sartomer Company, Tg=about 101° C.), pentaacrylate esters (e.g., SR-9041, commercially available from Sartomer Company, Tg=about 102° C.), pentaerythritol tetraacrylates (e.g., SR-295, commercially available from Sartomer Company, Tg=about 103° C.), pentaerythritol triacrylates (e.g., SR-444, commercially available from Sartomer Company, Tg=about 103° C.), ethoxylated(3) trimethylolpropane triacrylates (e.g., SR-454, commercially available from Sartomer Company, Tg=about 103° C.), alkoxylated trifunctional acrylate esters (e.g., SR-9008, commercially available from Sartomer Company, Tg=about 103° C.), dipropylene glycol diacrylates (e.g., SR-508, commercially available from Sartomer Company, Tg=about 104° C.), neopentyl glycol diacrylates (e.g., SR-247, commercially available from Sartomer Company, Tg=about 107° C.), cyclohexane dimethanol diacrylate esters (e.g., CD-406, commercially available from Sartomer Company, Tg=about 110° C.), cyclic diacrylates (e.g., IRR-214, commercially available from UCB Chemicals, Tg=about 208° C.), polyester acrylates (e.g., CN 2200, Tg=about −20° C., and CN2256, both commercially available from Sartomer Company) and tris (2-hydroxy ethyl) isocyanurate triacrylate (e.g., SR-368, commercially available from Sartomer Company, Tg=about 272° C.), acrylates of the foregoing methacrylates and methacrylates of the foregoing acrylates. Hexanediol diacrylate, butanediol diacrylate, pentaerythritol triacrylate ("PETA"), pentaerythritol tetraacrylate, trimethylolpropane triacrylate ("TMPTA") and aliphatic or cycloaliphatic urethane acrylate oligomers are especially preferred film formers. Use of film formers containing urethane functionality can contribute to toughness in the cured coating. Use of oligomeric film formers can reduce shrinkage, curl, and residual stress but may also compromise hardness. Mixtures of film formers can be employed. The composition should contain sufficient film former to provide a cured coating having the desired thickness and durability. Preferably, the composition contains about 10 to about 90 weight percent film former based on the total weight of solids in the composition. More preferably, the composition contains about 20 to about 80 weight percent film former, and most preferably about 25 to about 60 weight percent film former.

A variety of benzotriazoles can be employed in the invention. Representative benzotriazoles include, but are not limited to, those described in U.S. Pat No. 3,004,896 (Heller et al. '896), U.S. Pat No. 3,055,896 (Boyle et al.), U.S. Pat No. 3,072,585 (Milionis et al.), U.S. Pat No. 3,074,910 (Dickson, Jr.), U.S. Pat No. 3,189,615 (Heller et al. '615), U.S. Pat. No. 3,230,194 (Boyle), U.S. Pat No. 4,127,586 (Rody et al. '586), U.S. Pat No. 4,226,763 (Dexter et al. '763), U.S. Pat No. 4,275,004 (Winter et al. '004), U.S. Pat No. 4,315,848 (Dexter et al. '848), U.S. Pat No. 4,347,180 (Winter et al. '180), U.S. Pat No. 4,383,863 (Dexter et al. '863), U.S. Pat No. 4,675,352 (Winter et al. '352), U.S. Pat No. 4,681,905 (Kubota et al.), U.S. Pat No. 4,853,471 (Rody et al. '471), U.S. Pat No. 5,436,349 (Winter et al. '349), U.S. Pat No. 5,516,914 (Winter et al. '914), U.S. Pat No. 5,607, 987 (Winter et al. '987), U.S. Pat No. 5,977,219 (Ravichandran et al. '219), U.S. Pat No. 6,187,845 (Renz et al.) and U.S. Pat No. 6,262,151 (Ravichandran et al. '151). Polymerizable benzotriazoles can be employed if desired. Most preferably the benzotriazole is substituted in the 5-position of the benzo ring by a thio ether, alkylsulfonyl or phenylsulfonyl moiety such as the benzotriazoles described in U.S. Pat. Nos. 5,278,314 (Winter et al. '314), U.S. Pat No. 5,280,124 (Winter et al. '124), Winter et al. '349 and Winter et al. '914, or substituted in the 5-position of the benzo ring by an electron withdrawing group such as the benzotriazoles described in Ravichandran et al. '219. Further preferred benzotriazoles also include 2-(2-hydroxy-3,5-di-alpha-cumylphenyl)-2H-benzotriazole (TINUVIN™ 234 or TINUVIN 900, both commercially available from Ciba Specialty Chemicals), 5-chloro-2-(2-hydroxy-3-tert-butyl-5-methylphenyl)-2H-benzotriazole (TINUVIN 326, commercially available from Ciba Specialty Chemicals), 5-chloro-2-(2-hydroxy-3,5-di-tert-butylphenyl)-2H-benzotriazole (TINUVIN 327, commercially available from Ciba Specialty Chemicals), 2-(2-hydroxy-3,5-di-tert-amylphenyl)-2H-benzotriazole (TINUVIN 328, commercially available from Ciba Specialty Chemicals), 2-(2-hydroxy-3-alpha-cumyl-5-tert-octylphenyl)-2H-benzotriazole (TINUVIN 928, commercially available from Ciba Specialty Chemicals) and 5-trifluoromethyl-2-(2-hydroxy-3-alpha-cumyl-5-tert-octylphenyl)-2H-benzotriazole (CGL-139, commercially available from Ciba Specialty Chemicals). Mixtures of benzotriazoles can be employed. TINUVIN 328, TINUVIN 928 and CGL-139 are especially preferred benzotriazoles due to their high solubility in monomers such as isobornyl acrylate. Due to its relatively low cost, TINUVIN 928 is an especially preferred choice for use on PET and HSPET supports. Due to its performance, CGL-139 is an especially preferred choice for use on naphthalate polyester supports, which require special UV protection at certain wavelengths.

The composition contains more than 15 weight percent of the benzotriazole. The benzotriazole upper amount limit will depend in part on the chosen benzotriazole, monomer and other ingredients in the composition. The upper amount limit generally corresponds to the level at which blooming, hazing or phase separation is observed. Blooming may not be observed until after cure and some aging has taken place. Heat or solvents (e.g., ethyl acetate, toluene, acetone or hexanes) can be used to facilitate quick dissolution of the benzotriazole in the coating composition. Preferably, the composition contains about 16 to about 35 weight percent benzotriazole in the coating composition based on the total weight of solids in the composition. More preferably, the composition contains about 20 to about 35 weight percent benzotriazole, and most preferably about 21 to about 35 weight percent benzotriazole.

A variety of copolymerizable monomers that solubilize the UV absorber (sometimes referred to below as "solubilizing monomers") can be employed in the invention. Usually the solubilizing monomer will be monofunctional, and when combined by itself with an appropriate UV photoinitiator and appropriately irradiated with UV light usually will cure or gel but will not readily form a substantially continuous coating of crosslinked polymer. However, some bifunctional monomers (e.g., butanediol diacrylate) having a suitably low viscosity and suitable solubilizing power for a UV absorber may be employed in the invention as both a vinyl-functional crosslinkable film former and as a solubilizing monomer. In most instances however the vinyl-functional crosslinkable film former and the solubilizing monomer will be distinct chemical species. The solubilizing monomer should be able to solubilize a sufficient amount of the benzotriazole so that a composition of the invention will form a homogenous mixture. Unlike a solvent, the solubilizing monomer will largely remain in the coating composition after application of the coating composition to the support and exposure to suitable drying conditions, and will largely be incorporated into the cured composition. Representative solubilizing monomers include, but are not limited to, monofunctional monomers such as isooctyl acrylate (e.g., SR-440, commercially available from Sartomer Company, Tg=about −45 to −54° C.), 2-ethylhexyl acrylate (Tg=about −50° C.), cyclohexyl acrylate (Tg=about 19° C.), t-butyl acrylate (Tg=about 41° C.), n-octyldecyl acrylate (Tg=about 42° C.), glycidyl methacrylate (e.g., SR-379, commercially available from Sartomer Company, Tg=about 41–74° C.), 1,4-butanediol diacrylate (e.g., SR-213), benzyl methacrylate (Tg=about 54° C.), isobornyl acrylate (e.g., SR-506, commercially available from Sartomer Company, Tg=about 88–94° C.), isobornyl methacrylate (e.g., SR-423, commercially available from Sartomer Company, Tg=about 110° C.), t-butylcyclohexyl acrylate, 1-adamantyl acrylate, dicyclopentenyl acrylate and n-vinyl caprolactam. Higher Tg solubilizing monomers are preferred where harder cured coatings are desired. Acrylates are preferred over methacrylates where rapid reactivity is desired. Those skilled in the art will appreciate that lower Tg solubilizing monomers may be preferred where softer cured coatings are desired and that methacrylates may be preferred where slower reactivity is desired. Isobornyl acrylate and t-butylcyclohexyl acrylate are especially preferred solubilizing monomers. Mixtures of solubilizing monomers can be employed. The composition should contain sufficient solubilizing monomer to solubilize the benzotriazole in the composition and form a homogenous mixture that does not exhibit blooming after cure. Preferably, the composition contains about 5 to about 95 weight percent solubilizing monomer based on the total weight of solids in the composition. More preferably, the composition contains about 10 to about 80 weight percent solubilizing monomer, and most preferably about 15 to about 60 weight percent solubilizing monomer.

Preferably the compositions of the invention are photopolymerizable. When a photoinitiator is not employed, then a curing technique such as e-beam irradiation can be used to effect photocuring. More preferably the compositions contain a photoinitiator, e.g., a UV photoinitiator or a photo-initiator that can be activated by UV or visible light ("UV/Vis" photoinitiator), and will be light polymerizable. A variety of photoinitiators can be employed to facilitate photopolymerization. Care should be taken in selection of the photoinitiator so that the coating will be both photopolymerizable and UV protecting after cure. Exemplary photoinitiators include, but are not limited to, 1-phenyl-2-hydroxy-2-methyl-1-propanone; oligo{2-hydroxy-2-methyl-1-[4-(methylvinyl)phenyl]propanone}; 2-hydroxy 2-methyl 1-phenyl propan-1 one (DAROCURE™ 1173, commercially available from Ciba Specialty Chemicals); bis(2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy)phenyl-2-hydroxy-2-(methylpropyl)ketone; 2,2-dimethoxy-2-phenyl acetophenone; benzophenone; benzoic acid; (n-5,2, 4-cyclopentadien-1-yl)[1,2,3,4,5,6-n)-(1-methylethyl) benzene]-iron(+)hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE 500, commercially available from Ciba Specialty Chemicals); bis(n,5,2,4-cyclopentadien-1-yl)-bis[2,6-difluoro-3-(1H-pyrrol-1-yl)phenyl]titanium (IRGACURE 784 DC, commercially available from Ciba Specialty Chemicals); 2-benzyl-2-N,N-dimethyl amino-1-(4-morpholinophenyl)-1-butanone (IRGACURE 369, commercially available from Ciba Specialty Chemicals); 2,2-Dimethoxy-1,2-diphenylethan-1-one (IRGACURE 651, commercially available from Ciba Specialty Chemicals); bis(2,4,6-trimethylbenzoyl)phenylphosphineoxide (IRGACURE 819); and the EB3, KB1, TZT, KIP 100F, ITX, EDB, X15 and KT37 series of ESACURE™ photoinitiators (commercially available from Sartomer Company). Mixtures of photoinitiators can be employed, and can be especially useful for obtaining good absorption at short wavelengths for surface cure together with good absorption at long wavelengths for bulk cure. When oxygen is present during curing at levels above about 400 ppm then it may be preferable to employ a second photoinitiator that absorbs at a wavelength less than about 360 nm. Suitable second photoinitiators include IRGACURE 184, DAROCURE 1173, hydroxy-alkyl phenyl ketone photoinitiators and benzophenone. When a photoinitiator is employed in the composition, sufficient photoinitiator should be present to attain the desired rate, degree and depth of photocuring without unduly harming storage stability. Preferably, the composition contains about 0.1 to about 8 weight percent photoinitiator based on the total weight of solids in the composition. More preferably, the composition contains about 0.5 to about 5 weight percent photoinitiator, and most preferably about 1 to about 4 weight percent photoinitiator.

The compositions of the invention can also contain submicron inorganic particles such as silica or alumina particles. Inclusion of such particles can alter the hardness, scratch resistance or abrasion resistance of the cured coating, sometimes accompanied by a decrease in UV resistance. Preferably the inorganic particles are submicron particles having an average-particle diameter less than about 100 nm. Most preferably the inorganic particles are functionalized or are treated with a suitable coupling agent (e.g., a silanol) to increase the available loading level or to improve particle retention in the cured coating. Representative inorganic particles are described in U.S. Pat. No. 5,104,929 (Bilkadi) and Pickett et al., and include but are not limited to fumed silicas such as AEROSIL™ OX-50 silica (commercially available from Degussa-Hüls AG) and CABOSIL™ M5 silica (commercially available from Cabot Corp.); silica hydrosols such as the NALCO™ series of colloidal silica sols (commercially available from Nalco Chemical Company), the LUDOX™ series of silica sols (commercially available from DuPont Silica Products) and the KLEBOSOL™ and HIGHLINK™ series of colloidal silica sols (commercially available from Clariant Corporation). Representative aluminas include but are not limited to Aluminum Oxide C (commercially available from Degussa-Hüls AG) and KLEBOSOL 30CAL25 alumina modified colloidal silica (commercially available from Clariant Corporation). When hydrosols are employed, suitable control or adjustment of pH may be desirable to maintain a dispersion of the inorganic particles and to prevent undesired side reactions or inadvertent cure. When employed, the composition should contain sufficient inorganic particles to provide the desired degree of hardness and scratch or abrasion resistance. When silica is used as the submicron particle, the composition preferably contains about 1 to about 65 weight percent inorganic particles based on the total weight of solids in the composition, more preferably about 15 to about 60 weight percent inorganic particles, and most preferably about 25 to about 50 weight percent inorganic particles. Hardness and scratch or abrasion resistance are often more dependent on particle volume fraction than on particle weight fraction, so these values preferably are adjusted as appropriate when inorganic particles having a density significantly different from that of silica are employed.

The compositions of the invention can contain a variety of adjuvants to alter the behavior or performance of the composition before or after application to a support. Preferred adjuvants include fillers (e.g., particles of about 1 to about 10 micrometers average particle diameter), which can impart a hazy or diffuse appearance to the cured coating. Other preferred adjuvants include pigments, dyes, optical brighteners, leveling agents, flow agents and other surface-active agents, defoamers, solvents to aid in coating and to accelerate or to slow the drying rate, waxes, indicators, light stabilizers (e.g., hindered amine light stabilizers or "HALS") and antioxidants. The types and amounts of such adjuvants will be apparent to those skilled in the art.

The smoothness, continuity, weathering characteristics or adhesion of the coating composition to the underlying support preferably can be enhanced by priming, application of a tie layer or other appropriate pretreatment. Preferred pretreatments include low solids solutions of polyvinylidene dichloride; solvent-borne mixtures of polyester resins and aziridine crosslinkers; solvent-borne or aqueous polyol resins with optional crosslinkers such as aziridines or melamines; electrical discharge in the presence of a suitable reactive or non-reactive atmosphere (e.g., plasma, glow discharge, corona discharge, dielectric barrier discharge or atmospheric pressure discharge); chemical pretreatment and flame pretreatment. These pretreatments help make the support more receptive to the cured coating composition. When a tie layer is employed, it may have a thickness of a few nm (e.g., 1 or 2 nm) to about 500 nm, and can be thicker if desired. The coating compositions of the invention can be applied using conventional coating methods such as roll coating (e.g., gravure roll coating), spin coating, spray coating (e.g., conventional or electrostatic spray coating), padding or other techniques that will be familiar to those skilled in the art. Preferably the coating is applied at a rate that will yield a cured coating thickness less than about 0.1 mm, more preferably less than about 0.05 mm, and most preferably between about 0.01 mm and about 0.025 mm. On single-side-coated thin supports, excessive curl may be observed when coating thicknesses greater than about 0.05 mm are employed. When high levels of inorganic particles are incorporated into the coating composition then thinner coating thicknesses may be desired in order to achieve through curing.

If the coating composition contains a solvent, the applied coating can be dried using air, heat or other conventional techniques. The applied coating can be crosslinked using any appropriate method. When crosslinking using UV radiation, light having a wavelength between about 360–440 nm is preferred, with light having a wavelength of about 395–440 nm being most preferred. A variety of UV light sources can be employed. Representative sources include but are not limited to a FUSION™ H-bulb high-intensity mercury lamp (which emits three bands centered at 254, 313, 365 nm and is commercially available from Fusion UV Systems, Inc.), a FUSION D-bulb iron-doped mercury lamp (which adds emission at 380–400 nm but which may emit less at lower wavelengths, and is commercially available from Fusion UV Systems, Inc.) and a FUSION V-bulb gallium-doped mercury lamp (which adds emission at 404–415 nm but which may emit less at lower wavelengths, and is commercially available from Fusion UV Systems, Inc.). In general, lower wavelengths promote surface cure and higher wavelengths promote bulk cure. A FUSION D-bulb generally represents a desirable overall compromise. Curing can take place under a suitable atmosphere, e.g., a nitrogen atmosphere to provide inerted curing.

The cured coating preferably is visible light transmissive and more preferably is optically clear. The cured coating preferably provides significant protection against not only UV exposure but also weathering in general. The benzotriazole component in the coating can provide useful absorbance at wavelengths beyond 400 nm when used in a suitably high concentration, while exhibiting permanence in the polymer network and an absence of blooming. Most preferably the cured coating enables an underlying support to have at least a 5 and most preferably at least a 10 year useful life when weathered outdoors in Miami, Fla. at a 45° south-facing exposure angle. End of useful life in such an evaluation can be taken as the time at which excessive yellowness occurs (as indicated by an increase of 4 or more in the b* value obtained using a D65 light source, reflected mode and the CIE L*a*b* color space); or by significant cracking, peeling or delamination; or by sufficiently intense haze to be objectionable to the naked eye. Weathering can also be evaluated using the same criteria and a suitable accelerated weathering testing cycle such as the cycle described in ASTM G155 or equivalent. When so evaluated, the cured coating preferably maintains acceptable appearance through a radiant dose of 17,000 kJ/m$^2$ at 340 nm (believed to be equivalent to about 5 years of Miami, Fla. 45° south-facing exposure), and more preferably maintains acceptable appearance through a radiant dose of 34,000 kJ/m$^2$ at 340 nm (believed to be equivalent to about 10 years of Miami, Fla. 45° south-facing exposure). Unacceptable appearance is taken to be an increase of the b* value by 4 units or more, or the onset of significant cracking, peeling, delamination or haze. In contrast, unprotected naphthalate polyester films have a useful life of only about 6 to 12 months when weathered outdoors in Miami, Fla. at 45° south-facing exposure angle, and maintain acceptable appearance through a radiant dose of about 2,340 kJ/m$^2$ at 340 nm when evaluated using an accelerated weathering testing cycle.

Various functional layers or other supplemental coatings can be applied to the cured coating composition to alter or improve the cured coating composition's physical or chemical properties. Such supplemental coatings can include but are not limited to antireflective coatings; anti-fogging coatings; antistatic coatings; flame retardants; additional abrasion resistant or hardcoat layers; visible light-transmissive conductive layers or electrodes (e.g., of indium tin oxide); magnetic or magneto-optic coatings or domains; photographic emulsions or images; prismatic coatings; holographic coatings or images; adhesives such as pressure sensitive adhesives or hot melt adhesives; primers to promote adhesion by adjacent layers; and low adhesion backsize materials for use when the coated support is to be used in adhesive roll form.

The coatings of the invention can be treated with, for example, inks or other printed indicia such as those used to display product identification, orientation information, advertisements, warnings, decoration, or other information. Various techniques can be used to print on such articles, including but not limited to screen printing, inkjet printing, thermal transfer printing, letterpress printing, offset printing, flexographic printing, stipple printing, laser printing, and so forth. A variety of inks can be used, including one and two component inks, oxidatively drying and UV-drying inks, dissolved inks, dispersed inks, and 100% ink systems.

The coatings of the invention can be used for a variety of applications. Representative applications include but are not limited to coatings on multilayer visible mirror films such as those used in mirrors, light tubes, lamp and bulb cavity reflectors, solar collectors, mirror finishes and imitation chrome; multilayer infrared ("IR") mirror applications such as vehicular or architectural glazing, greenhouse panels and sensors; solar cells; signage; graphic arts films; point of purchase displays; decorative films; in-mold decoration for cell-phone bodies; apparel (e.g., athletic shoes) and home appliances.

The invention will now be described with reference to the following non-limiting examples, in which all parts and percentages are by weight unless otherwise indicated.

EXAMPLE 1–12 AND COMPARATIVE EXAMPLES 1–5

The solubility of the benzotriazole 2-(2-hydroxy-3-alpha-cumyl-5-t-octylphenyl)-5-trifluoromethylbenzotriazole (CGL-139, experimentally available from Ciba Specialty Chemicals) in various solubilizing monomers was determined. Mixtures were made up using 5% increments of the benzotriazole. The benzotriazole and solubilizing monomer to be tested were mixed with gentle heating to 70° C. in a water bath until dissolved, then allowed to stand for 48 hours at room temperature. After 48 hours, each mixture was inspected for benzotriazole precipitation. Solubility was determined to within 5% by recording the highest concentration tested for which there was no precipitation and the lowest concentration for which precipitation occurred. The results are set out below in Table 1. Where reported in the literature, the Tg of a polymer made entirely of the tested solubilizing monomer is also given.

TABLE 1

| Example or Comparative Example No. | Solubilizing Monomer | Benzotriazole 48 hr Solubility, wt. % | Tg (° C.) |
|---|---|---|---|
| 1 | t-butyl acrylate | 40–45% | 41 |
| 2 | cyclohexyl acrylate | 35–40% | 19 |
| 3 | t-butylcyclohexyl acrylate | 35–40% | |
| 4 | isobornyl acrylate | 25–30% | 94 |
| 5 | isooctyl acrylate | 25–30% | −45 |
| 6 | 2-ethylhexyl acrylate | 25–30% | −50 |
| 7 | Isobornyl methacrylate | 25–30% | 110 |
| 8 | benzyl methacrylate | 25–30% | 54 |
| 9 | n-octyldecyl acrylate | 20–25% | 42 |
| 10 | glycidyl methacrylate | 20–25% | 74 |
| 11 | n-vinyl caprolactam | 20–25% | |
| 12 | butanediol diacrylate | 15–20% | |
| Comp. Ex. 1 | hexanediol diacrylate | 10–15% | 43 |
| Comp. Ex. 2 | phenoxyethyl acrylate | 5–10% | |
| Comp. Ex. 3 | trimethylolpropane triacrylate | 0–5% | |
| Comp. Ex. 4 | polyethylene glycol 200 diacrylate | 0–5% | |
| Comp. Ex. 5 | tripropyleneglycol diacrylate | 0–5% | |

As shown in Table 1, acrylates tended to provide better benzotriazole solubilization than methacrylates, and monofunctional monomers solubilized the benzotriazole at higher levels without precipitation than did di- and higher-functional monomers. However, the difunctional monomer butanediol diacrylate also solubilized the benzotriazole at a very high level.

EXAMPLES 13–20

Using the method of Example 1, the solubility of a variety of benzotriazoles in isobornyl acrylate was determined. The formula for each of the tested benzotriazoles is set out above. These benzotriazoles can also be represented using the general structure 2-(2-hydroxy-3-$R_2$-5-$R_3$-phenyl)-5-$R_1$-benzotriazole. For CGL-139, $R_1$=trifluoromethyl, $R_2$=alpha-cumyl, and $R_3$=t-octyl. For TINUVIN 928, $R_1$=H, $R_2$=alpha-cumyl, and $R_3$=t-octyl. For Tinuvin 328, $R_1$=H, $R_2$=t-amyl, and $R_3$=t-amyl. For TINUVIN 327, $R_1$=chloro, $R_2$=t-butyl, and $R_3$=t-butyl. For TINUVIN 326, $R_1$=chloro, $R_2$=t-butyl, and $R_3$=methyl. For both TINUVIN 234 and TINUVIN 900, $R_1$=H, $R_2$=alpha-cumyl, and $R_3$=alpha-cumyl. The results are set out below in Table 2.

TABLE 2

| Example No. | UV Absorber | Benzotriazole 48 hr Solubility, wt. % |
|---|---|---|
| 13 | TINUVIN 928 | 30–35% |
| 14 | CGL-139 | 25–30% |
| 15 | TINUVIN 328 | 20–25% |
| 16 | TINUVIN 327/928 (50:50 Blend) | 10–15% |
| 17 | TINUVIN 326 | 5–10% |
| 18 | TINUVIN 327 | 5–10% |
| 19 | TINUVIN 900 | 0–5% |
| 20 | TINUVIN 234 | 0–5% |

As shown in Table 2, very high solubilities could be obtained, especially when using the benzotriazoles TINUVIN 928 and CGL-139.

EXAMPLES 21–27 AND COMPARATIVE EXAMPLES 6–17

Several coating compositions were prepared by adding varying amounts of CGL-139 benzotriazole to mixtures containing isobornyl acrylate ("IBOA", obtained as SR-506 from Sartomer Company), hexanediol diacrylate ("HDODA", obtained as SR-238 from Sartomer company), pentaerythritol tetraacrylate ("PETA", obtained as SR-295 from Sartomer company), and urethane acrylate oligomer ("UA", obtained as CN966B85 from Sartomer company in a blend believed to contain 85% urethane acrylate oligomer and 15% HDODA) or an optional silane-treated colloidal silica hydrosol.

The silane-treated colloidal silica hydrosol was prepared as the reaction product of NALCO™ 2327 silica hydrosol (commercially available from Ondeo Nalco Co.) with 3-(trimethozysilyl)propyl methacrylate (obtained as A174 from Sigma-Aldrich Co.) in the presence of 1-methoxy-2-propanol (commercially available from Dow Chemical Co.). 400 Parts of the hydrosol were charged to a reaction vessel. 450 Parts of the 1-methoxy-2-propanol and 25.22 parts of the 3-(trimethoxysilyl)propyl methacrylate were mixed together and added to the vessel while stirring. The vessel was sealed and heated at 80° C. for 16.5 hours. This product was combined with 228 parts of a 40/40/20 mixture of SR295/SR238/SR506, and water and alcohol were removed via rotary evaporation. The resulting silane-treated colloidal silica hydrosol contained 38.5% $SiO_2$ as measured by thermogravimetric analysis. Analysis using gas chromatography confirmed that no alcohol remained in the hydrosol.

The coating compositions also contained 1% of a hindered amine light stabilizer (TINUVIN 123, commercially available from Ciba Specialty Chemicals), 1% of a photo-initiator (IRGACURE 819, commercially available from Ciba Specialty Chemicals) and 0.15 to 0.2% of a coating leveling aid (TEGO™ RAD 2100, commercially available from the Tego Division of Degussa Corporation). 0.2% of the coating leveling aid was used in compositions containing silane-treated colloidal silica hydrosol. 0.15% of the coating leveling aid was used in the remaining compositions. The coating compositions were applied to a developmental multilayer visible mirror optical film (similar to Radiant Mirror Film VM2000, commercially available from 3M) having PEN layers and PVdC priming, by dissolving the coating composition in ethyl acetate to form coating solutions containing 40% ethyl acetate and 60% coating solids. The coatings were applied using a standard coater, dried and cured in-line using a 12 m/min line speed at coating thicknesses ranging from 6 to 35 micrometers in an inert atmosphere having an oxygen concentration below 100 ppm. UV photocuring energy was supplied using a high intensity FUSION D-bulb powered with 236 Joules/sec-cm input power. Under those conditions the D-bulb yielded doses and intensities in the various UV wavelength regions set out below in Table 3.

TABLE 3

| Wavelength Region | Dose (J/cm$^2$) | Intensity (W/cm$^2$) |
|---|---|---|
| UVA (320–380 nm) | 1.294 | 5.512 |
| UVB (280–320 nm) | 0.625 | 2.030 |
| UVC (250–260 nm) | 0.040 | 0.131 |
| UVV (395–445 nm) | 0.690 | 2.716 |

The coated articles were exposed to an accelerated weathering test similar to the procedure in ASTM G155, using a modified cycle 1 with a black panel temperature of 70° C. during the light only cycle, and were then evaluated at intervals corresponding to UV dose levels of 9,400, 18,700, and 30,500 kJ/m$^2$ at 340 nm. These doses are believed to be equivalent to more than 2.5, 5, and 8.25 years, respectively, of outdoor weathering in Miami, Fla. at a 45° south-facing exposure angle. The change in the b* value was measured at each interval using a BYK Gardner TCSII Colorimeter and a D65 light source, large area reflected mode, specular included, CIE L*a*b* color space. Set out below in Table 4 are the Example or Comparative Example No., benzotriazole amount, relative amounts of IBOA/HDODA/PETA/UA/SiO$_2$, and the measured change in the b* value at each weathering interval. The symbol "R" indicates that a sample was retired due to significant cracking, peeling, delamination or haze.

TABLE 4

| Example or Comparative Example No. | Benzotriazole, % | Other Coating Solids, IBOA/HDODA/ PETA/UA/SiO$_2$ | Coating thickness, μm | Change in b* value after exposure, dose in kJ/m$^2$ at 340 nm | | | | | |
|---|---|---|---|---|---|---|---|---|---|
| | | | | 4,700 | 9,400 | 14,000 | 18,700 | 23,400 | 28,100 |
| 21 | 20 | 30:33:20:17:0 | 10 | 0.3 | 1.1 | 1.8 | 2.8 | 4.9 | R |
| Comp. Ex. 6 | 10 | 30:33:20:17:0 | 10 | 1.1 | 4.5 | 4.5 | 4.4 | 7.6 | R |
| 22 | 20 | 50:13:20:17:0 | 10 | 0.0 | 0.8 | 0.9 | 1.9 | 4.0 | R |
| Comp. Ex. 7 | 10 | 50:13:20:17:0 | 10 | 0.7 | 3.8 | 5.1 | 4.3 | 4.3 | R |
| 23 | 22 | 30:33:20:17:0 | 20 | 0.6 | 1.3 | 1.1 | 1.9 | 3.7 | 6.0 |
| Comp. Ex. 8 | 8 | 30:33:20:17:0 | 20 | −0.1 | 1.2 | 2.6 | 3.7 | 4.3 | R |
| Comp. Ex. 9 | 15 | 30:33:20:17:0 | 20 | −0.1 | 0.7 | 0.5 | 1.2 | 3.1 | 4.8 |
| 24 | 22 | 50:13:20:17:0 | 20 | −0.1 | 0.5 | 0.2 | 0.5 | 1.8 | 2.9 |
| Comp. Ex. 10 | 8 | 50:13:20:17:0 | 20 | −0.1 | 1.2 | 2.5 | 3.5 | 4.0 | R |
| Comp. Ex. 11 | 15 | 50:13:20:17:0 | 20 | −0.1 | 0.6 | 0.4 | 0.9 | 2.5 | 4.1 |
| 25 | 20 | 30:33:20:17:0 | 30 | 0.4 | 1.1 | 7.0 | 1.1 | 2.6 | 4.0 |
| Comp. Ex. 12 | 10 | 30:33:20:17:0 | 30 | −0.3 | 0.5 | 0.1 | 0.8 | 2.1 | 3.7 |
| 26 | 20 | 50:13:20:17:0 | 30 | −0.1 | 0.5 | 0.1 | 0.3 | 1.2 | 2.2 |
| Comp. Ex. 13 | 10 | 50:13:20:17:0 | 30 | −0.3 | 0.5 | 0.1 | 0.6 | 1.9 | 3.5 |
| 27 | 16.6 | 15.1:30.2:30.2:0:24.5 | 11 | 0.1 | 1.3 | 1.9 | 3.6 | 7.5 | R |
| Comp. Ex. 14 | 5.8 | 14.4:28.8:28.8:0:27.9 | 11 | 1.4 | 4.9 | 21.6 | R | R | R |
| Comp. Ex. 15 | 11.1 | 14.7:29.5:29.5:0:26.3 | 11 | −0.1 | 0.8 | 1.8 | 4.7 | 8.6 | R |
| Comp. Ex. 16 | 15 | 15:30:30:0:25 | 8 | 0.0 | 1.3 | 2.7 | R | R | R |
| Comp. Ex. 17 | 15 | 15:30:30:0:25 | 15 | −0.2 | 0.6 | 0.5 | R | R | R |

"R" = Sample retired due to significant cracking, peeling, delamination or haze.

As shown in Table 4, coatings containing more benzotriazole and articles with thicker coatings tended to give better weathering performance. The articles of Examples 21 and 22 (which contained 20 percent benzotriazole had a 10 μm coating thickness) did not reach or exceed a 4 unit b* increase until a dose of 23,400 kJ/m$^2$, whereas the articles of Comparison Examples 6 and 7 (which contained 10 percent benzotriazole and had a 10 μm coating thickness) exceeded a 4 unit change after a dose of 9,400 and 14,000 kJ/m$^2$, respectively. The article of Example 23 (which contained 22 percent benzotriazole and had a 20 μm coating thickness) did not reach or exceed a 4 unit b* increase until a dose of 28,100 kJ/m$^2$, whereas the article of Comparison Example 8 (which contained 8 percent benzotriazole and had a 20 μm coating thickness) exceeded a 4 unit change after a dose of 23,400 kJ/m$^2$. The article of Comparison Example 9 (which contained 15 percent benzotriazole and had a 20 μm coating thickness) exceeded a 4 unit change after a dose of 28,100 kJ/m$^2$ and thus appeared to give performance roughly comparable to the article of Example 23. However, in a further comparison performed using a higher IBOA level, the article of Example 24 (which like the article of Example 23 contained 22 percent benzotriazole and had a 20 μm coating thickness) had not yet exceeded a 4 unit b* increase after a dose of 28,100 kJ/m$^2$, whereas the articles of Comparison Examples 10 and 11 (which contained 8 and 15 percent benzotriazole, respectively and had a 20 μm coating thickness) reached or exceeded a 4 unit change after doses of 23,400 and 28,100 kJ/m$^2$, respectively. A comparison like that drawn for Examples 23 and 24 and their respective Comparison Examples 8–11 could also be drawn for Examples 25 and 26 and their respective Comparison Examples 12 and 13, with comparable weathering performance being observed for articles containing a lower IBOA level (viz., the articles of Example 25 and Comparison Example 12) and with better weathering performance being observed for an article containing both a higher benzotriazole level and higher IBOA level (viz., the article of Example 26 vs. the article of Comparison Example 13).

Silica-containing articles also showed improved weathering at high UVA levels. The article of Example 27 (which contained 16.6 percent UVA and had an 11 μm coating thickness) did not exceed a 4 unit change in its b* value until a dose of 23,400 kJ/m$^2$, whereas the articles of Comparison Examples 14–17 (which respectively contained 5.8, 11.1, 15 and 15 percent UVA and had an 11, 11, 8 or 15 μm coating thickness) exceeded a 4 unit change or were withdrawn due to cracking, peeling, delamination or haze after doses of 9,400 to 18,700 kJ/m$^2$.

EXAMPLE 28

A coating solution was prepared in which butanediol diacrylate served both as the vinyl functional crosslinkable film former and as the solubilizing monomer. 13.58 Parts SR-213 (1,4-butanediol diacrylate), 2.72 parts CGL-139 (UVA), 0.17 parts TINUVIN 123 (HALS), 0.17 parts IRGACURE 819 and 0.34 parts IRGACURE 184 (photoinitiators), 0.02 parts TEGO RAD 2100 (leveling agent), and 3 parts ethyl acetate (solvent) were combined and blended until the solids had dissolved. This corresponded to a CGL-139 loading of 16.0% of the total coating solids. The solution was coated onto a PVdC primed VM2000 film (commercially available from 3M). The solvent was flashed off at 70° C. The coating was cured under nitrogen using a FUSION D-bulb. One specimen of the coated article was left at room conditions for one week. The specimen exhibited no blooming during this time. Two additional specimens of the coated article were oven treated at about 100° C. for one week. One specimen was allowed to hang free in the oven, while the other was placed horizontally between two glass plates, with a piece of plain polyester film between the upper glass plate and the coated side of the specimen. Neither specimen exhibited signs of blooming.

Various modifications and alterations of this invention will be apparent to those skilled in the art without departing from this invention. This invention should not be restricted to that which has been set forth herein only for illustrative purposes.

We claim:

1. A homogeneous coating composition comprising:
   a) at least one vinyl-functional crosslinkable film former;

b) more than 15 weight percent benzotriazole UV absorber; and c) at least one copolymerizable monomer that solubilizes the benzotriazole.

2. A composition according to claim 1 wherein the film former comprises a di-, tri- or higher functional acrylate or methacrylate.

3. A composition according to claim 1 wherein the film former comprises butanediol diacrylate.

4. A composition according to claim 1 wherein the film former comprises hexanediol diacrylate, butanediol diacrylate, pentaerythritol triacrylate, pentaerythritol tetraacrylate or trimethylolpropane triacrylate.

5. A composition according to claim 1 wherein the film former contains urethane functionality.

6. A composition according to claim 1 wherein the benzotriazole is substituted in the 5-position of the benzo ring by a thio ether, alkyl sulfonyl or phenyl sulfonyl moiety.

7. A composition according to claim 1 wherein the benzotriazole is substituted in the 5-position of the benzo ring by an electron withdrawing group.

8. A composition according to claim 1 wherein the benzotriazole comprises 2-(2-hydroxy-3,5-di-tert-amylphenyl)-2H-benzotriazole.

9. A composition according to claim 1 wherein the benzotriazole comprises 2-(2-hydroxy-3-alpha-cumyl-5-tert-octylphenyl)-2H-benzotriazole.

10. A composition according to claim 1 wherein the benzotriazole comprises 5-trifluoromethyl-2-(2-hydroxy-3-alpha-cumyl-5-tert-octylphenyl)-2H-benzotriazole.

11. A composition according to claim 1 wherein the monomer comprises isooctyl acrylate, 2-ethylhexyl acrylate, t-butyl acrylate, glycidyl methacrylate, benzyl methacrylate, isobornyl acrylate, isobornyl methacrylate, t-butylcyclohexyl acrylate, cyclohexyl acrylate, n-octyldecyl acrylate, butanediol diacrylate, 1-adamantyl acrylate, dicyclopentenyl acrylate or n-vinyl caprolactam.

12. A composition according to claim 1 wherein the monomer comprises isobornyl acrylate.

13. A homogeneous coating composition comprising:

(a) at least one vinyl-functional crosslinkable film former;

(b) more than 15 weight percent benzotriazole UV absorber; and (c) at least one copolymerizable monomer that solubilizes the benzotriazole wherein the monomer comprises t-butylcyclohexyl acrylate.

14. A composition according to claim 1 wherein the film former and monomer are chemically distinct species.

15. A composition according to claim 1 wherein the film former and monomer are the same species.

16. A composition according to claim 1 comprising about 16 to about 35 weight percent benzotriazole based on the total weight of solids in the composition.

17. A composition according to claim 1 comprising about 20 to about 35 weight percent benzothiazole based on the total weight of solids in the composition.

18. A composition according to claim 1 comprising about 21 to about 35 weight percent benzotriazole based on the total weight of solids in the composition.

19. A composition according to claim 1 further comprising submicron inorganic particles.

* * * * *

UNITED STATES PATENT AND TRADEMARK OFFICE
CERTIFICATE OF CORRECTION

PATENT NO. : 6,974,850 B2
DATED : December 13, 2005
INVENTOR(S) : McMan, Steven J.

It is certified that error appears in the above-identified patent and that said Letters Patent is hereby corrected as shown below:

Column 13,
Line 51, delete "trimethozysilyl" and insert -- trimethoxysilyl --.

Column 18,
Line 24, delete "benzothiazole" and insert -- benzotriazole --.

Signed and Sealed this

Twenty-third Day of May, 2006

JON W. DUDAS
*Director of the United States Patent and Trademark Office*